US010876407B2

(12) United States Patent
Miller et al.

(10) Patent No.: US 10,876,407 B2
(45) Date of Patent: Dec. 29, 2020

(54) THERMAL STRUCTURE FOR OUTER DIAMETER MOUNTED TURBINE BLADES

(71) Applicant: General Electric Company, Schenectady, NY (US)

(72) Inventors: Brandon Wayne Miller, Liberty Township, OH (US); Jeffrey Donald Clements, Mason, OH (US); Daniel Waslo, Marblehead, MA (US); Joel Francis Kirk, Monroe, OH (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 15/434,658

(22) Filed: Feb. 16, 2017

(65) Prior Publication Data
US 2018/0230805 A1    Aug. 16, 2018

(51) Int. Cl.
*F01D 5/03* (2006.01)
*F01D 5/08* (2006.01)
(Continued)

(52) U.S. Cl.
CPC .................. *F01D 5/08* (2013.01); *F01D 1/26* (2013.01); *F01D 5/03* (2013.01); *F01D 5/06* (2013.01);
(Continued)

(58) Field of Classification Search
CPC ..... F01D 5/08; F01D 1/26; F01D 5/03; F01D 5/06; F01D 5/186; F01D 5/187;
(Continued)

(56) References Cited

U.S. PATENT DOCUMENTS 2,509,442 A * 5/1950 Matheisel ................ B63H 1/16
                                                        310/67 R
3,015,524 A * 1/1962 Slayter ..................... F01D 5/03
                                                        384/117
(Continued)

FOREIGN PATENT DOCUMENTS

CA          2321640 A1 * 10/1999    ............. F01D 5/022
CA          2376163 A1 *  1/2001    ............. F01D 5/022
(Continued)

OTHER PUBLICATIONS

U.S. Appl. No. 15/412,157, filed Jan. 23, 2017.
U.S. Appl. No. 15/412,175, filed Jan. 23, 2017.
U.S. Appl. No. 15/412,197, filed Jan. 23, 2017.

*Primary Examiner* — Jason D Shanske
*Assistant Examiner* — Brian Christopher Delrue
(74) *Attorney, Agent, or Firm* — Dority & Manning, P.A.

(57) ABSTRACT

The present disclosure is directed to a gas turbine engine defining a radial direction, a circumferential direction, an axial centerline along a longitudinal direction, and an upstream end and a downstream end along the longitudinal direction. The gas turbine engine defines a core flowpath extended generally along the longitudinal direction. The gas turbine engine includes a first turbine rotor. The first turbine rotor includes an annular outer band disposed outward of the core flowpath along the radial direction. The first turbine rotor further includes a plurality of airfoils coupled to an inner diameter of the outer band in which the plurality of airfoils are extended generally inward along the radial direction. The outer band defines a plurality of airfoil cooling passages in which the plurality of airfoil cooling passages are extended at least partially in the radial direction in fluid communication with the plurality of airfoils.

20 Claims, 3 Drawing Sheets

(51) Int. Cl.
  *F01D 5/06* (2006.01)
  *F01D 5/18* (2006.01)
  *F01D 1/26* (2006.01)
  *F01D 11/08* (2006.01)
  *F02C 3/04* (2006.01)

(52) U.S. Cl.
  CPC ............ *F01D 5/186* (2013.01); *F01D 5/187* (2013.01); *F01D 11/08* (2013.01); *F02C 3/04* (2013.01); *F05D 2220/32* (2013.01); *F05D 2240/14* (2013.01); *F05D 2240/24* (2013.01); *F05D 2240/55* (2013.01); *F05D 2250/185* (2013.01); *F05D 2260/202* (2013.01)

(58) Field of Classification Search
  CPC .......... F01D 11/08; F01D 5/045; F01D 5/046; F01D 5/022; F02C 3/04; F05D 2220/32; F05D 2240/14; F05D 2240/24
  USPC ...................................................... 415/116
  See application file for complete search history.

(56) References Cited

U.S. PATENT DOCUMENTS

| | | | | |
|---|---|---|---|---|
| 3,034,298 A * | 5/1962 | White | ................. | F01D 11/10 415/116 |
| 3,224,194 A * | 12/1965 | De Feo | ................. | F01D 5/08 415/115 |
| 3,351,319 A * | 11/1967 | Frost | ................. | F01D 5/022 415/208.2 |
| 3,588,269 A * | 6/1971 | Wall, Jr. | ................. | F01D 17/162 415/115 |
| 3,703,081 A * | 11/1972 | Krebs | ................. | F01D 5/06 60/226.1 |
| 3,788,065 A * | 1/1974 | Markowski | ................. | F02K 1/386 431/173 |
| 3,903,690 A | 9/1975 | Jones | | |
| 4,314,791 A * | 2/1982 | Weiler | ................. | F01D 5/187 415/115 |
| 4,348,157 A * | 9/1982 | Campbell | ................. | F01D 5/081 415/115 |
| 4,704,862 A | 11/1987 | Dennison et al. | | |
| 4,809,498 A * | 3/1989 | Giffin, III | ................. | B64C 11/48 416/129 |
| 4,827,712 A * | 5/1989 | Coplin | ................. | F02K 3/06 415/210.1 |
| 4,860,537 A | 8/1989 | Taylor | | |
| 4,916,894 A * | 4/1990 | Adamson | ................. | F02C 3/107 416/171 |
| 5,145,316 A * | 9/1992 | Birch | ................. | F01D 5/225 415/173.1 |
| 5,188,506 A * | 2/1993 | Creevy | ................. | F01D 11/005 277/643 |
| 5,307,622 A * | 5/1994 | Ciokajlo | ................. | F02C 3/067 415/65 |
| 5,470,524 A * | 11/1995 | Krueger | ................. | B22F 5/009 419/10 |
| 5,488,825 A * | 2/1996 | Davis | ................. | F01D 5/187 415/115 |
| 5,697,208 A * | 12/1997 | Glezer | ................. | F01D 5/022 60/785 |
| 5,809,772 A * | 9/1998 | Giffin, III | ................. | F02K 3/075 60/226.1 |
| 5,993,150 A * | 11/1999 | Liotta | ................. | F01D 11/10 415/115 |
| 6,393,831 B1 * | 5/2002 | Chamis | ................. | F02K 3/025 60/226.1 |
| 6,398,487 B1 * | 6/2002 | Wallace | ................. | F01D 5/082 415/115 |
| 6,546,713 B1 | 4/2003 | Hidaka et al. | | |
| 6,619,030 B1 * | 9/2003 | Seda | ................. | F01D 9/041 60/226.1 |
| 6,666,017 B2 | 12/2003 | Prentice et al. | | |
| 6,684,626 B1 * | 2/2004 | Orlando | ................. | F01D 5/03 415/65 |
| 6,763,652 B2 * | 7/2004 | Baughman | ................. | F02C 3/067 415/199.5 |
| 7,186,073 B2 * | 3/2007 | Orlando | ................. | F01D 1/26 29/889.21 |
| 7,195,446 B2 * | 3/2007 | Seda | ................. | F01D 1/24 415/229 |
| 7,334,985 B2 * | 2/2008 | Lutjen | ................. | F01D 11/24 415/173.1 |
| 7,493,753 B2 * | 2/2009 | Moniz | ................. | F01D 25/16 415/9 |
| 7,600,967 B2 * | 10/2009 | Pezzetti, Jr. | .......... | F01D 11/005 415/115 |
| 7,758,303 B1 * | 7/2010 | Wadia | ................. | F01D 5/022 415/77 |
| 7,832,193 B2 * | 11/2010 | Orlando | ................. | F01D 15/12 415/61 |
| 8,011,877 B2 * | 9/2011 | Schilling | ................. | F01D 5/03 415/91 |
| 8,152,469 B2 * | 4/2012 | Suciu | ................. | F01D 11/02 416/175 |
| 8,166,748 B2 * | 5/2012 | Schilling | ................. | F01D 1/26 60/268 |
| 8,245,519 B1 * | 8/2012 | Liang | ................. | F01D 5/186 415/115 |
| 8,365,510 B2 | 2/2013 | Lugg | | |
| 8,371,127 B2 * | 2/2013 | Durocher | ................. | F01D 5/082 415/115 |
| 8,667,773 B2 * | 3/2014 | Silkowski | ................. | F02C 3/067 415/136 |
| 8,667,775 B1 | 3/2014 | Kisska et al. | | |
| 8,756,908 B2 * | 6/2014 | Sheridan | ................. | F02C 7/06 60/39.08 |
| 8,784,045 B2 * | 7/2014 | Zoric | ................. | F01D 11/001 415/173.5 |
| 8,905,719 B2 * | 12/2014 | Kray | ................. | F01D 9/042 416/230 |
| 8,935,913 B2 * | 1/2015 | Kupratis | ................. | F02K 3/072 60/226.1 |
| 8,998,573 B2 * | 4/2015 | Albers | ................. | F01D 11/005 415/173.3 |
| 9,016,041 B2 * | 4/2015 | Baughman | ................. | F02K 3/065 60/226.1 |
| 9,103,227 B2 | 8/2015 | Kupratis et al. | | |
| 9,127,549 B2 * | 9/2015 | Lacy | ................. | F01D 5/225 |
| 9,206,700 B2 * | 12/2015 | Lee | ................. | F01D 9/042 |
| 9,279,341 B2 * | 3/2016 | Durocher | ................. | F01D 25/125 |
| 9,494,077 B2 | 11/2016 | Chanez et al. | | |
| 9,915,159 B2 * | 3/2018 | Huizenga | ................. | F01D 9/047 |
| 9,938,846 B2 * | 4/2018 | Freeman | ................. | F01D 11/08 |
| 2002/0148233 A1 * | 10/2002 | Tiemann | ................. | F01D 5/187 60/806 |
| 2002/0182057 A1 * | 12/2002 | Liotta | ................. | F01D 9/041 415/115 |
| 2003/0051484 A1 * | 3/2003 | Kuo | ................. | F01D 5/03 60/804 |
| 2003/0070418 A1 * | 4/2003 | Eiler | ................. | B64D 27/02 60/262 |
| 2003/0163983 A1 * | 9/2003 | Seda | ................. | F01D 5/03 60/226.1 |
| 2004/0018081 A1 * | 1/2004 | Anderson, Jr. | .......... | F01D 25/14 415/108 |
| 2004/0055276 A1 * | 3/2004 | John Lewis | ................. | F02C 3/067 60/226.1 |
| 2004/0194469 A1 * | 10/2004 | Butler | ................. | F02C 3/165 60/776 |
| 2005/0226720 A1 * | 10/2005 | Harvey | ................. | F01D 5/03 415/198.1 |
| 2006/0093468 A1 * | 5/2006 | Orlando | ................. | F01D 1/26 415/68 |
| 2007/0022738 A1 * | 2/2007 | Norris | ................. | F01D 5/022 60/226.1 |
| 2007/0025837 A1 * | 2/2007 | Pezzetti, Jr. | .......... | F01D 11/005 415/115 |

(56) References Cited

U.S. PATENT DOCUMENTS

| | | | | |
|---|---|---|---|---|
| 2007/0081890 | A1* | 4/2007 | Lutjen | F01D 11/24 415/115 |
| 2007/0126292 | A1* | 6/2007 | Lugg | F01D 5/03 310/11 |
| 2007/0295011 | A1* | 12/2007 | Suciu | F01D 5/022 60/772 |
| 2009/0169385 | A1* | 7/2009 | Suciu | F01D 5/022 416/179 |
| 2010/0089019 | A1 | 4/2010 | Knight et al. | |
| 2010/0115967 | A1* | 5/2010 | Maltson | F01D 5/186 60/806 |
| 2010/0124495 | A1* | 5/2010 | Bifulco | F01D 5/066 415/216.1 |
| 2010/0126141 | A1* | 5/2010 | Schilling | F01D 1/26 60/268 |
| 2010/0129227 | A1* | 5/2010 | Schilling | F01D 5/03 416/229 A |
| 2010/0154384 | A1* | 6/2010 | Schilling | F02C 3/107 60/268 |
| 2011/0048117 | A1* | 3/2011 | Kell | F01D 5/186 73/112.01 |
| 2011/0315789 | A1* | 12/2011 | Bachman | F23R 3/18 239/265.17 |
| 2013/0205803 | A1* | 8/2013 | Xu | F01D 5/186 60/806 |
| 2013/0312425 | A1* | 11/2013 | Thornton | F01D 5/187 60/806 |
| 2014/0000285 | A1* | 1/2014 | Bergman | F01D 9/02 60/806 |
| 2014/0083116 | A1* | 3/2014 | Crites | F01D 5/187 60/806 |
| 2014/0157792 | A1* | 6/2014 | Itzel | F01D 9/041 60/806 |
| 2014/0230443 | A1* | 8/2014 | Plante | F02C 3/073 60/767 |
| 2014/0301858 | A1* | 10/2014 | Lin | F01D 5/225 416/230 |
| 2014/0348664 | A1* | 11/2014 | Jan | F01D 5/081 416/96 R |
| 2015/0198380 | A1* | 7/2015 | Haj-Hariri | B64G 1/50 62/3.2 |
| 2015/0240643 | A1* | 8/2015 | Guemmer | F04D 29/544 415/62 |
| 2016/0061113 | A1* | 3/2016 | Romanov | B22C 9/10 60/806 |
| 2016/0061451 | A1* | 3/2016 | Dudebout | F23R 3/06 60/806 |
| 2016/0069260 | A1 | 3/2016 | Speak et al. | |
| 2016/0076451 | A1* | 3/2016 | McBrien | F01D 5/186 60/806 |
| 2016/0102607 | A1 | 4/2016 | Hiernaux | |
| 2016/0123156 | A1* | 5/2016 | Hucker | F01D 5/186 60/806 |
| 2016/0201474 | A1* | 7/2016 | Slavens | F01D 5/186 60/806 |
| 2016/0305281 | A1* | 10/2016 | Ballard, Jr. | F01D 25/14 |
| 2017/0175751 | A1* | 6/2017 | Moniz | F04D 27/006 |
| 2017/0226861 | A1* | 8/2017 | Evain | F04D 29/522 |
| 2017/0248028 | A1* | 8/2017 | Schilling | F01D 11/24 |
| 2018/0045073 | A1* | 2/2018 | Wiedenhoefer | F04D 29/545 |
| 2018/0274365 | A1* | 9/2018 | Stuart | F01D 1/26 |
| 2018/0340470 | A1* | 11/2018 | Stuart | F02C 7/06 |
| 2018/0363677 | A1* | 12/2018 | Kroger | F04D 29/544 |
| 2019/0085710 | A1* | 3/2019 | van der Merwe | F01D 11/025 |
| 2019/0085715 | A1* | 3/2019 | van der Merwe | F01D 15/10 |
| 2019/0093489 | A1* | 3/2019 | Mondal | F01D 5/02 |

FOREIGN PATENT DOCUMENTS

| | | | | |
|---|---|---|---|---|
| CA | 2355428 | A1 * | 4/2002 | F01D 5/022 |
| CA | 2419367 | A1 * | 9/2003 | F01D 5/03 |

\* cited by examiner

THERMAL STRUCTURE FOR OUTER DIAMETER MOUNTED TURBINE BLADES

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Interdigitated turbine sections are known to take advantage of relatively high fluid velocities between sequential stages of rotating airfoils without vanes therebetween. However, known interdigitated turbine sections generally lack effective thermal structures that may provide cooling to a turbine rotor with outer diameter mounted turbine blades. Such limitations may limit turbine interdigitation due to combustion gas temperatures. For example, known interdigitated turbine sections are generally limited to interdigitating only a low pressure turbine rotor and an intermediate pressure turbine rotor. Still further, where known interdigitated turbine sections may include a high pressure turbine rotor or otherwise higher temperature combustion gases, structural deterioration may disable or limit apparatuses into which such an interdigitated turbine rotor may be employed (e.g., aircraft, power generation, etc.).

Therefore, there exists a need for a thermal structure that may provide cooling to a turbine rotor with outer diameter mounted turbine blades.

BRIEF DESCRIPTION

Aspects and advantages of the invention will be set forth in part in the following description, or may be obvious from the description, or may be learned through practice of the invention.

The present disclosure is directed to a gas turbine engine defining a radial direction, a circumferential direction, an axial centerline along a longitudinal direction, and an upstream end and a downstream end along the longitudinal direction. The gas turbine engine defines a core flowpath extended generally along the longitudinal direction. The gas turbine engine includes a first turbine rotor. The first turbine rotor includes an annular outer band disposed outward of the core flowpath along the radial direction. The first turbine rotor further includes a plurality of airfoils coupled to an inner diameter of the outer band in which the plurality of airfoils are extended generally inward along the radial direction. The outer band defines a plurality of airfoil cooling passages in which the plurality of airfoil cooling passages are extended at least partially in the radial direction in fluid communication with the plurality of airfoils.

In various embodiments, the outer band defines a first aperture and a second aperture in which the first aperture defines a first aperture area and the second aperture defines a second aperture area. The first aperture is defined at an outer diameter of the outer band and the second aperture is defined at an inner diameter of the outer band. In one embodiment, the first aperture area defines a greater area than the second aperture area. In another embodiment, the airfoil cooling passage is defined between the first aperture and the second aperture. In yet another embodiment, the outer band includes a first cooling passage wall and a second cooling passage wall at each of the plurality of airfoil cooling passages between the first aperture and the second aperture. In still another embodiment, each of the first cooling passage walls and second cooling passage walls together define a serpentine structure between the outer diameter and inner diameter of the outer band. In still yet another embodiment, the cooling passage defined between the first aperture and the second aperture defines a decreasing volume of the cooling passage.

In one embodiment of the gas turbine engine, the outer band further defines a plurality of axial passages extended generally along the longitudinal direction.

In another embodiment, the plurality of airfoils defines one or more cooling fluid orifices at an outer diameter of the airfoil.

In still another embodiment, the airfoil cooling passage is extended at partially along the circumferential direction in the same direction of rotation as the first turbine rotor along the circumferential direction.

In various embodiments, the engine further includes a second turbine rotor interdigitated among the first turbine rotor along the longitudinal direction in which the second turbine rotor includes a plurality of second turbine airfoils extended outward in the radial direction. In one embodiment, the engine defines, in serial flow arrangement from the upstream end to the downstream end, the plurality of airfoils of the first turbine rotor, the plurality of second airfoils of the second turbine rotor, and the plurality of airfoils of the first turbine rotor. In another embodiment, the engine further includes a combustion section disposed upstream of the first turbine rotor and the second turbine rotor. In still another embodiment, the engine defines, in serial flow arrangement, the combustion section, the plurality of airfoils of the first turbine rotor, the plurality of second airfoils of the second turbine rotor, and the plurality of airfoils of the first turbine rotor.

In still various embodiments, the engine further includes a turbine casing surrounding the first turbine rotor along the longitudinal direction and the circumferential direction. In one embodiment, the turbine casing and the first turbine rotor together define a first seal interface disposed upstream of the plurality of airfoils of the first turbine rotor and a second seal interface disposed downstream of the plurality of airfoils of the first turbine rotor. In another embodiment, the turbine casing and the first turbine rotor define a cooling cavity between the first seal interface, the second seal interface, the turbine casing, and the outer band of the first turbine rotor.

In still another embodiment, the turbine casing includes a plurality of shrouds disposed inward along the radial direction and the first turbine rotor includes a plurality of knife edge seals disposed outward along the radial direction toward the plurality of shrouds. In one embodiment, an upstream portion of the plurality of shrouds and an upstream portion of the plurality of knife edge seals define the first seal interface and a downstream portion of the plurality of shrouds and a downstream portion of the plurality of knife edge seals define the second seal interface.

In another embodiment, the first turbine rotor of the gas turbine engine further includes a connecting airfoil disposed downstream of the plurality of airfoils in which the connecting airfoil is coupled to the outer band on a radially outward end, and wherein the connecting airfoil is coupled to a rotor on a radially inward end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
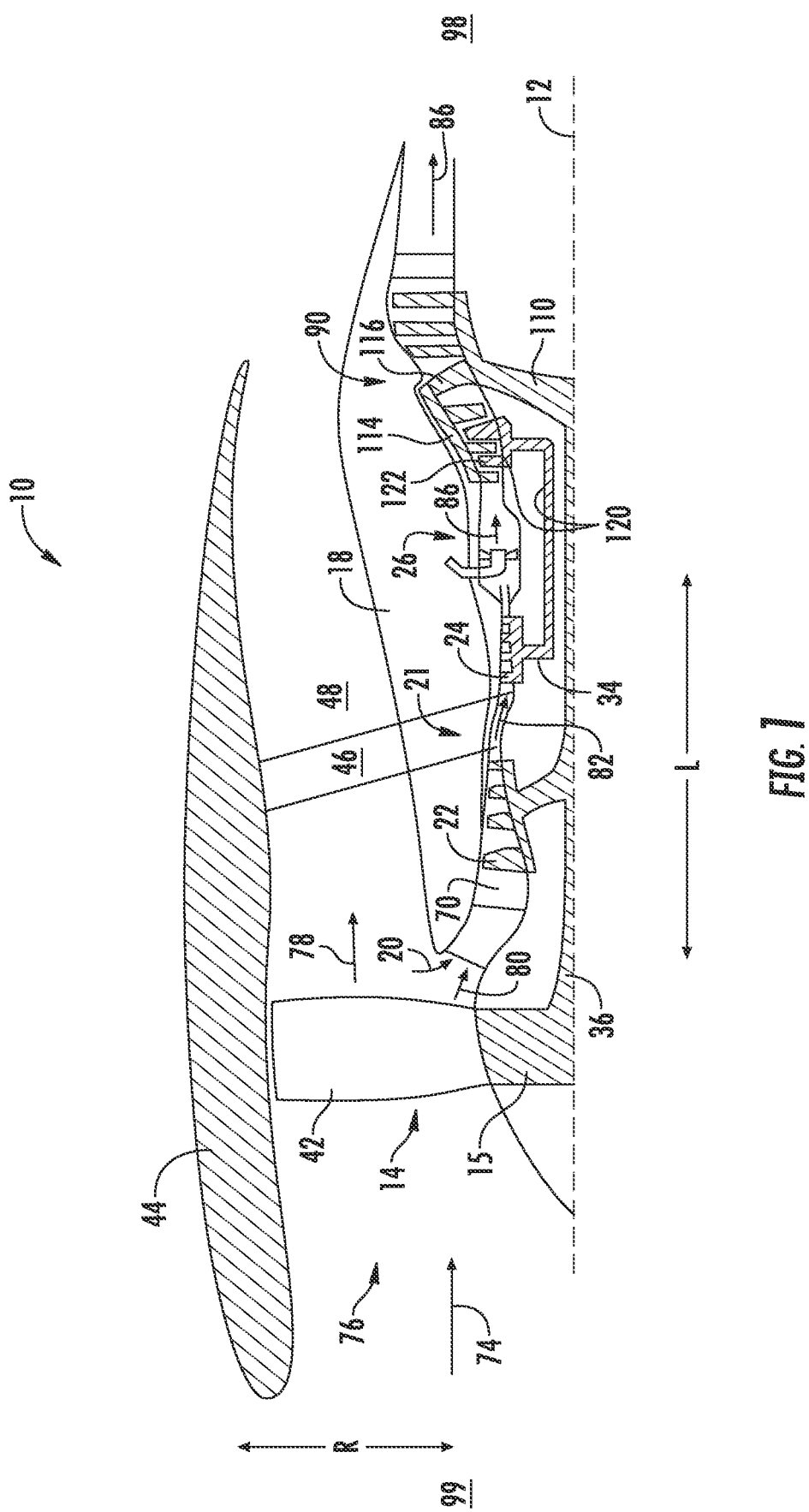
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry into a compressor section through exit from a turbine section.

Various embodiments of a thermal structure for outer diameter mounted turbine blades are generally provided. The gas turbine engine to which the thermal structure for the outer diameter mounted turbine blades is attached includes a first turbine rotor that includes an annular outer band disposed outward of the core flowpath along the radial direction. The annular outer band defines the thermal structure. The first turbine rotor further includes a plurality of airfoils coupled to an inner diameter of the outer band in which the plurality of airfoils are extended generally inward along the radial direction, i.e. defining outer diameter mounted turbine blades. The outer band defines a plurality of airfoil cooling passages in which the plurality of airfoil cooling passages are extended at least partially in the radial direction in fluid communication with the plurality of airfoils.

The outer band may provide thermal attenuation for an overhung outer diameter turbine rotor. In various embodiments, the outer band including the thermal structure as described herein may enable interdigitation of a first turbine rotor forward of a second turbine rotor. In various embodiments, the first turbine rotor may define a low speed turbine rotor coupled to a fan assembly and/or low pressure compressor. The second turbine rotor may define an intermediate or high speed turbine rotor coupled to an intermediate or high pressure compressor, respectively.

The interdigitated turbine section may increase fuel efficiency, operational efficiency, and/or power output while reducing weight, part count, and/or packaging (e.g. radial and/or axial dimensions). For example, the interdigitated turbine section may enable increased bypass ratio and/or overall pressure ratio of the gas turbine engine, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") while additionally reducing an average work factor per stage of the turbine section. The systems provided herein may further increase overall gas turbine engine efficiency by reducing or eliminating stationary airfoils that require cooling air (e.g. nozzle guide vane).

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, an upstream end 99 and a downstream end 98 along the longitudinal direction L, and a circumferential direction C (shown in FIG. 3).

In general, the engine 10 may include a substantially tubular outer casing 18 that defines an annular inlet 20. The outer casing 18 encases or at least partially flows, in serial flow arrangement along the longitudinal direction L, a compressor section 21, a combustion section 26, and an interdigitated turbine section 90 (herein referred to as "turbine section 90"). A fan assembly 14 is disposed generally forward or upstream 99 of the compressor section 21. In the embodiment shown in FIG. 1, the engine 10 defines a two-spool configuration in which the compressor section 21 includes a first compressor 22 and a second compressor 24 in serial arrangement along the longitudinal direction L. The fan assembly 14 and the first compressor 22 are coupled to a first shaft 36 toward the upstream end 99 of the engine 10 and a first turbine rotor 110 is coupled to the first shaft 36 toward the downstream end 98 of the engine 10. The second compressor 24 is coupled to a second shaft 34 and a second turbine rotor 120 is coupled to the second shaft 34 toward the downstream end 98 of the engine 10. In various embodiments, the first compressor 22 defines a low pressure (LP) compressor and the second compressor 24 defines a high pressure (HP) compressor. In still various embodiments, the first turbine rotor 110 may define an LP turbine and the second turbine rotor 120 may define an HP turbine.

In other embodiments, the engine 10 may define a three-spool configuration in which the compressor section 21 defines a first compressor 22, a second compressor 24, and a third compressor disposed between the first compressor 22 and the second compressor 24 along the longitudinal direction L. The third compressor may be coupled to and rotatable with a third shaft driven by a third turbine rotor coupled thereto. The third turbine rotor may define an IP turbine driving the third compressor defining an IP compressor. In such an embodiment, the third turbine rotor may be disposed in interdigitation among the first turbine rotor 110 in addition to or in lieu of the second turbine rotor 120 defining the HP turbine.

Referring back to FIG. 1, the fan assembly 14 includes a fan rotor 15 and at least one stage of a plurality of fan blades 42 coupled thereto. The plurality of fan blades 42 are coupled to and extend outwardly from the fan rotor 15 in the radial direction R. In various embodiments, the fan rotor 15 may include a plurality of stages of fan blades 42 along the longitudinal direction L. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

In other embodiments, the fan assembly 14 may further include a power or reduction gearbox disposed between the fan rotor 15 and a first shaft 36 coupled to the turbine section 90. The gearbox may reduce the rotational speed of the fan rotor 15 relative to the turbine rotor of the turbine section 90 to which the fan rotor 15 is attached via the first shaft 36.

Figure 2:
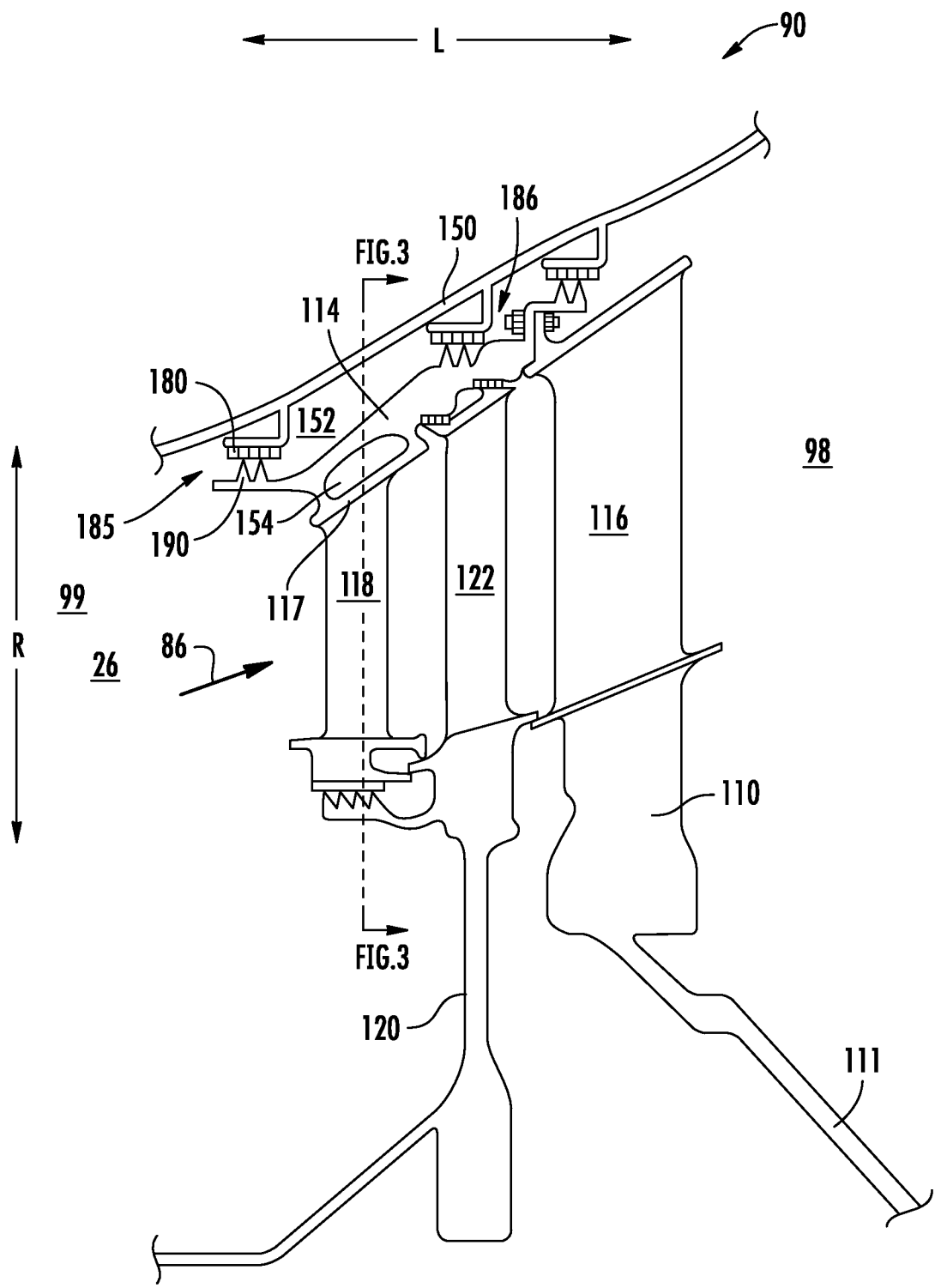
FIG. 2 is a schematic cross sectional view of an embodiment of the turbine section shown in FIG. 1.

Referring now to FIG. 2, an exemplary embodiment of the turbine section 90 of the engine 10 is generally provided. The turbine section 90 includes a first turbine rotor 110. The first turbine rotor 110 includes an annular outer band 114 disposed outward along the radial direction R of the core flowpath 70 of the turbine section 90. The first turbine rotor 110 further includes a plurality of airfoils 118 coupled to an inner diameter of the outer band 114. The plurality of airfoils 118 extend generally inward along the radial direction R. The outer band 114 defines a plurality of airfoil cooling passages 103. The plurality of airfoil cooling passages 103 extend at least partially in the radial direction R in fluid communication with the plurality of airfoils 118.

In various embodiments, the first turbine rotor 110 includes a plurality of connecting airfoil 116 disposed aft or downstream of the plurality of airfoils 118. The connecting airfoil 116 is coupled to the outer band 114 on an outward end along the radial direction R. The connecting airfoil 116 is further coupled on an inward end along the radial direction R to the first turbine rotor 110 at a rotor 111. The rotor 111 is coupled to the first shaft 36. In various embodiments, the rotor 111 defines a drum, disk, hub, etc. to which the connecting airfoils 116 are coupled.

Figure 3:
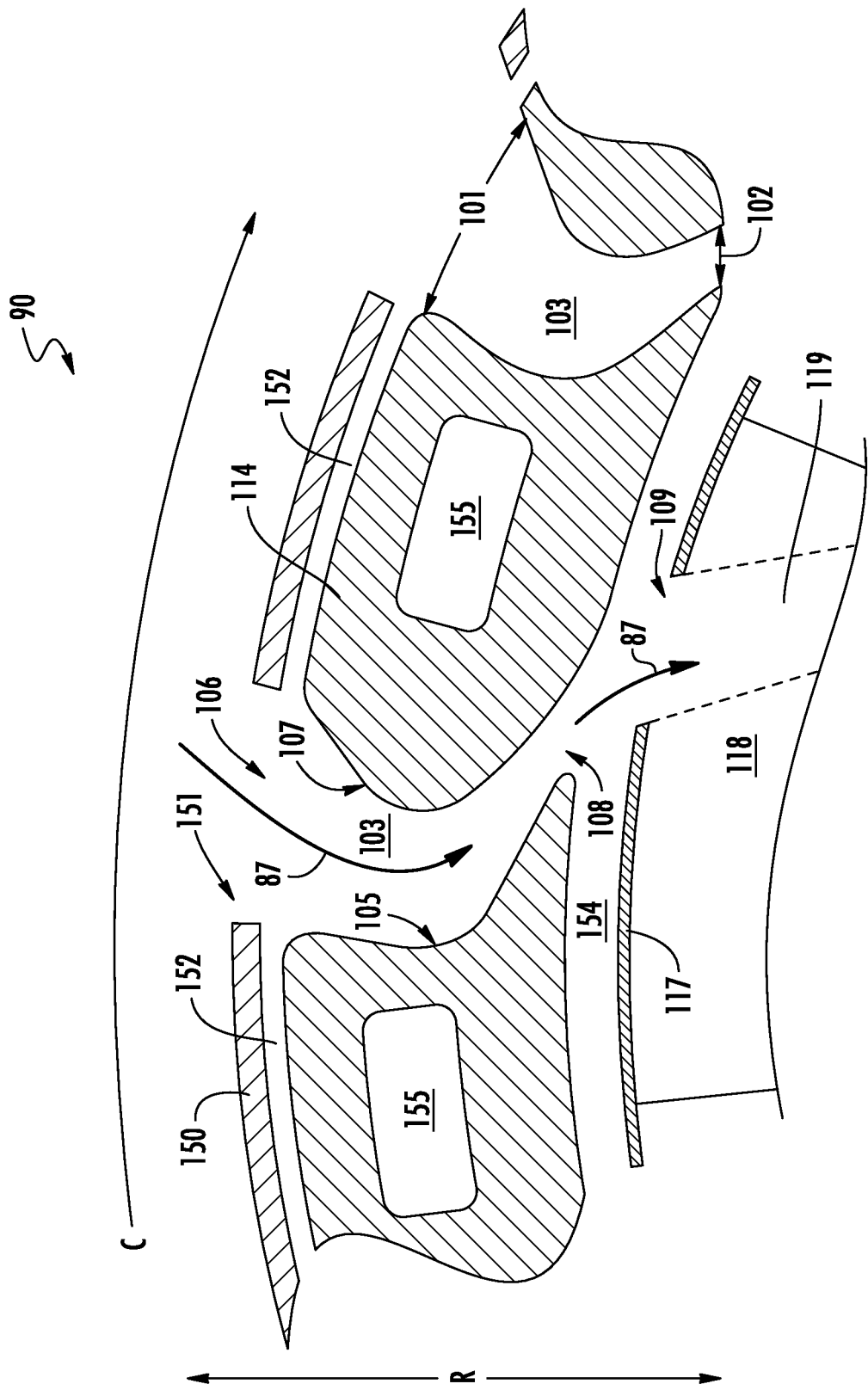
FIG. 3 is a partial circumferential view of an exemplary embodiment of a thermal structure for an outer diameter mounted turbine blade.

Referring now to FIG. 3, a radial cross sectional view of a portion of the outer band 14 and airfoils 118 of the turbine section 90 shown in FIG. 2 is generally provided. Referring to FIGS. 2 and 3, in various embodiments, the outer band 114 defines a first aperture 106 and a second aperture 108. The first aperture 106 is defined at an outer diameter of the outer band 114 and the second aperture 108 is defined at an inner diameter of the outer band 114. In one embodiment, the first aperture 106 defines a first aperture area 101 and the second aperture 108 defines a second aperture area 102. The first aperture area 101 may be greater than the second aperture area 102.

In various embodiments, the airfoil cooling passage 103 is defined between the first aperture 106 and the second aperture 108. In one embodiment, the airfoil cooling passage 103 defines a decreasing volume from the first aperture 106 to the second aperture 108.

In another embodiment, the airfoil cooling passage 103 defines a serpentine structure. For example, in various embodiments, the outer band 114 includes a first cooling passage wall 105 and a second cooling passage wall 107 at each of the cooling passages 103 between the first aperture 106 and the second aperture 108. In one embodiment, the first cooling passage wall 105 and the second cooling passage wall 107 together define a serpentine structure between an outer diameter and an inner diameter of the outer band 114. For example, the serpentine structure of the airfoil cooling passage 103 may be defined between the first aperture 106 and the second aperture 108.

Referring still to FIG. 3, the airfoils 118 of the first turbine rotor 110 may define a cooling fluid orifice 109 at an outer diameter 117 of each airfoil 118. The cooling fluid orifice 109 may extend at least partially along the radial direction R into and/or through the airfoil 118. In various embodiments, the cooling fluid orifice 109 may eject into the core flowpath 70 of the engine 10.

Referring now to FIGS. 1-3, during operation of the engine 10 a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 and through the inlet 20. The air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing the first and second turbine rotors 110, 120, and in various embodiments, the third turbine rotor, of the turbine section 90 to rotate and support operation of respectively coupled rotary members in the compressor section 21 and/or fan assembly 14.

A portion of cooling air flowing through the engine 10, such as the compressed air 82 from the compressor section 21, may be routed to the turbine section 90 and through the outer band 114, as shown schematically by arrows 87. The cooling air 87 provided to the outer band 114 routes from an opening 151 in a turbine casing 150 of the engine 10 surrounding at least a portion of the turbine section 90, such as surrounding the first turbine rotor 110 along the longitudinal direction L and the circumferential direction C (shown in FIG. 3). The turbine casing 150 is generally a static structure extended along the longitudinal direction L. The opening 151 in the turbine casing 150 may be disposed at one or more of the first aperture 106 of the outer band 114 along the longitudinal direction L, and outward along the radial direction R of one or more of the first aperture 106.

Referring to FIG. 3, during operation of the engine 10, the cooling air 87 flows through the opening 151 in the turbine casing 150 and through the rotating outer band 114 into the airfoil cooling passages 103. In an embodiment of the outer band 114 defining a generally decreasing volume from the first aperture 106 to the second aperture 108, the airfoil cooling passage 103 may act as a nozzle to increase a rate of flow of the cooling air 87 into the cooling fluid orifice 109 of each airfoil 118.

Referring still to the embodiment shown in FIG. 3, the outer band 114 may define the first aperture 106 and the second aperture 108 to accelerate the cooling air 87 at least partially in the circumferential direction C in the same direction of rotation along the circumferential direction C as the plurality of airfoils 118 coupled to the first turbine rotor 110. For example, as shown in FIG. 3, the airfoil cooling passage 103 is extended at least partially along the circumferential direction C in the same direction of rotation as the first turbine rotor 110 along the circumferential direction C. In the embodiment shown in FIG. 3, the airfoil cooling passage 103 extends toward the clockwise direction and the plurality of airfoils 118 rotate about the axial centerline 12 (shown in FIG. 1) in the same clockwise direction along the circumferential direction C. As another example, the second aperture 108 is disposed clockwise along the circumferential direction C relative to the first aperture 106 for each airfoil cooling passage 103 to dispose the cooling air 87 toward the clockwise direction in the same direction as the direction of rotation of the plurality of airfoils 118 of the first turbine rotor 110. It should be appreciated that in other embodiments, the aforementioned features and rotations may be inverted to induce a counter-clockwise direction of the cooling air 87 along with a counter-clockwise direction of rotation of the first turbine rotor 110.

As such, the cooling air 87 may decrease the thermal gradient across the outer band 114 and the airfoil 118. The cooling structure of the outer band 114 may enable disposing the airfoil 118 further upstream within the turbine section 90. For example, the cooling air 87 may decrease the thermal gradient of the outer band 114 and the airfoil 118 such that the airfoil 118 may be disposed forward or upstream of a second turbine rotor 120 defining a high speed turbine rotor. In embodiments in which the airfoil 118 defines a first stage of the first turbine rotor 110 defining the low speed turbine rotor, the thermal structure defined in the outer band 114 may enable removing a nozzle guide vane between the combustion section 26 and the turbine section 90. More specifically, the thermal structure defined in the outer band 114 may enable removing the nozzle guide vane between the combustion section 26 and the rotary components of the turbine section 90. Defining the first stage of the first turbine rotor 110 as immediately downstream 98 of the combustion section 26, without a first turbine vane or nozzle guide vane therebetween, as well as defining the first turbine rotor 110 in counter-rotation with the second turbine rotor 120, may reduce effects of overall combustion hot spots on the first stage of the first turbine rotor 110 in contrast to a stationary, first turbine vane or nozzle guide vane. As such, the turbine section 90 and engine 10 described herein may remove constraints to combustion section 26 design by de-empha-sizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

Referring back to FIG. 3, the outer band 114 may further define a plurality of axial passages 155 extended generally along the longitudinal direction L. The axial passages 155 may flow a fluid, such as cooling air 87, through the outer band 114 along the longitudinal direction L. The axial passages 155 may enable passage of cooling air 87 and heat transfer along the longitudinal direction L of the turbine section 90, such that a thermal gradient along the longitudinal direction L from a generally warmer upstream end 99 of the turbine section 90 is reduced or attenuated toward the downstream end 98.

Referring to FIG. 3, the outer band 114 may define a cooling channel 154 between an inner diameter of the outer band 114 and an outer diameter 117 of the airfoils 118. The cooling channel 154 may define a volume outward along the radial direction R of the airfoils 118. The cooling channel 154 may enable normalization of pressure and/or flow of the cooling air 87 from the outer band 114 to the plurality of airfoils 118. For example, the cooling channel 154 may enable normalization of pressure and/or flow of the cooling air 87 about the circumferential direction C of the turbine section 90 such that a generally even temperature distribution is defined along the circumferential direction C.

Referring still to FIG. 3, in one embodiment, the plurality of airfoils 118 defines one or more cooling fluid orifices 109 at the outer diameter 117 of the airfoils 118. The cooling fluid orifice 109 enables flow of the cooling air 87 exiting the cooling passages 103 of the outer band 114 into the airfoils 118. The airfoils 118 may define an airfoil cooling conduit 119 from the cooling fluid orifice 109 extended at least partially along the radial direction R. In various embodiments, the airfoil cooling conduit 119 further extends at least partially along the circumferential direction C and/or the longitudinal direction L. Referring to FIG. 2, the airfoil cooling conduit 119 may at least partially define a serpentine structure. In still various embodiments, the airfoil cooling conduit 119 may further define an outlet on the airfoils 118 in fluid communication with the core flowpath 70 of the turbine section 90 of the engine 10.

For example, in one embodiment, the outlet may be disposed toward the leading edge of the airfoil 118 such as shown at 113 in FIG. 2. In various embodiments, the outlet at the leading edge 113 may be defined at or near a stagnation point of the airfoil 118, in which a flow field of the combustion gases 86 through the core flowpath 70 defines a local velocity at the airfoil 118 of approximately zero.

In another embodiment, the outlet may be disposed toward the trailing edge of the airfoil 118 such as shown at 115 in FIG. 2. In still various embodiments, the outlet defined at 113 or 115 may be defined on a pressure side or suction side of the airfoil 118, disposed generally between the leading edge outlet 113 and the trailing edge outlet 115 along the longitudinal direction L. The various embodiments of the outer band 114 and airfoils 118 may provide a thermal attenuation structure for an outer diameter mounted airfoil of the turbine section 90. For example, the thermal attenuation structure defined by the outer band 114 and the airfoils 118 to which they attach may reduce a thermal gradient of the airfoils 118 disposed at an upstream end 99 of the turbine section 90.

Referring back to FIG. 2 in conjunction with FIG. 3, in various embodiments the turbine casing 150 and the first turbine rotor 110 together define a first seal interface 185 disposed forward or upstream of the plurality of airfoils 118 of the first turbine rotor 110. The turbine casing 150 and the first turbine rotor 110 may further define a second seal interface 186 disposed aft or downstream of the plurality of airfoils 118 of the first turbine rotor 110. The engine 10 may define a cooling cavity 152 between the first seal interface 185, the second seal interface 186, the turbine casing 150, and the outer band 114. The cooling cavity 152 may further attenuate a thermal gradient along the radial direction R and the longitudinal direction L across the turbine section 90 to further enable an overhung plurality of airfoils 118 forward of the second turbine rotor 120.

In various embodiments, seal interfaces 185, 186 may be defined by a plurality of shrouds 180 included with the turbine case 150 and disposed inward along the radial direction R of the turbine case 150. The first turbine rotor 110 may further include a plurality of knife edge seals 190 disposed outward along the radial direction R toward the plurality of shrouds 180 on the turbine case 150. For example, an upstream portion of the plurality of shrouds 180 and an upstream portion of the plurality of knife edge seals 190 define the first seal interface 185. As another example, a downstream portion of the plurality of shrouds 180 and a downstream portion of the plurality of knife edge seals 190 define the second seal interface 186.

In various embodiments, the outer band 114 and airfoils 118 may enable disposition of airfoils 118 forward or upstream of a second turbine rotor 120 defining a high pressure turbine, such as shown in FIG. 2. The second turbine rotor 120 may be disposed forward or upstream of the one or more connecting airfoils 116 of the first turbine rotor 110. The second turbine rotor 120 includes a plurality of second airfoils 122 extended outward along the radial direction R. In various embodiments, the second turbine rotor 120 is disposed forward or upstream 99 of the connecting airfoils 116 and in interdigitation with the first turbine rotor 110.

For example, as shown in FIG. 1, the engine 10 and turbine section 90 may define, in serial flow arrangement from the upstream end 99 to the downstream end 98, the plurality of outer shroud airfoils 118 of the first turbine rotor 110, the plurality of second airfoils 122 of the second turbine rotor 120, and the one or more connecting airfoils 116 of the first turbine rotor 110. In various embodiments, the turbine section 90 may define a plurality of iterations of the plurality of outer shroud airfoils 118 alternating with the plurality of second airfoils 122 along the longitudinal direction L. For example, the first turbine rotor 110 may define between three and ten rotating stages, inclusively. In one embodiment, the second turbine rotor 120 may define at least one rotating stage in interdigitation with the first turbine rotor 110.

In still another embodiment of the engine 10 shown in FIG. 1, the engine 10 defines the combustion section 26 upstream of the first turbine rotor 110 and the second turbine rotor 120. The engine 10 may define, in serial flow arrangement from the upstream end 99 to the downstream end 98, the combustion section 26, the plurality of airfoils 118 of the first turbine rotor 110, and a plurality of second airfoils 122 of the second turbine rotor 120. In various embodiments, the engine 10 defines the serial flow arrangement of the combustion section 26 and the turbine section 90 without a nozzle guide vane between the combustion section 26 and the first turbine rotor 110.

The thermal structure defined by the outer band 114 and the airfoils 118 may enable overhanging the first turbine rotor 110 forward or upstream of the second turbine rotor 120 defining a high pressure turbine. By defining the first turbine rotor 110 as a low speed turbine rotor interdigitated forward of the second turbine rotor 120 defining a high speed or high pressure turbine rotor, and defining the first turbine rotor 110 as the first stage of the turbine section 90 aft or downstream of the combustion section 26, various embodiments of the engine 10 may obviate the need for a first turbine vane or nozzle guide vane to accelerate the combustion gases 86 forward or upstream of the second turbine rotor 120 defining a high speed turbine. As such, the engine 10 may reduce a quantity or mass of cooling air from the compressor section 21 and/or combustion section 26, thereby increasing engine efficiency by enabling more energy (i.e. compressed air) to be used during combustion. Additionally, or alternatively, the turbine section 90 may reduce necessary cooling air and enable increased performance and/or operability of the compressor section 21, including surge margin and/or efficiency, or decrease a required amount of work from the compressor section 21, which may reduce axial dimensions or stages of the compressor section 21 and further reduce engine packaging, weight, and/or part count, and generally improve engine 10 performance.

Additionally, obviating the need for the first turbine vane or nozzle guide vane may enable the turbine section 90, or more specifically, the first stage, as a rotating stage, to be designed to an average combustion gas 86 temperature rather than designed to accommodate peak temperatures (i.e. high spots) along an annulus of the core flowpath 70 within the combustion section 26. Therefore, as all of the plurality of outer shroud airfoils 118 of the first stage are rotating, all of the plurality of outer shroud airfoils 118 may only transiently endure adverse effects of combustion hot spots rather than substantially sustained or constant exposure to a higher temperature from the combustion gases in contrast to other locations about the annulus of the core flowpath 70. Still further, the turbine section 90 described herein may enable alternative design methods for the combustion section 26 due to a decreased adverse effect of combustion hot spots on the turbine section 90. Therefore, the turbine section 90 may enable design of the combustion section 26 to further improve combustion stability, decrease emissions, increase operability across all or part of a flight envelope, increase altitude re-light performance, and/or decrease lean blowout (LBO).

Although not shown in FIG. 1, the engine 10 may further include a third turbine rotor coupled to and rotatable independently of the second turbine rotor 120 and in interdigitation with the first turbine rotor 110. Although not depicted in FIG. 1, it should be understood that one or more rotating stages of the second turbine rotor 120 depicted herein may alternatively be defined as the third turbine rotor driving a third compressor in the engine 10.

The turbine section 90, including the first turbine rotor 110, the second turbine rotor 120, or individual stages thereof, may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, may be formed using additive manufacturing or 3D printing, or casting, forging, machining, or castings formed of 3D printed molds, or combinations thereof. The turbine section 90, or portions thereof, may be mechanically joined using fasteners, such as nuts, bolts, screws, pins, or rivets, or using joining methods, such as welding, bonding, friction or diffusion bonding, etc., or combinations of fasteners and/or joining methods. The first turbine rotor 110 and/or the second turbine rotor 120, including individual stages thereof, may be constructed as individual blades installed into drums or hubs, or integrally bladed rotors (IBRs) or bladed disks, or combinations thereof.

The systems shown in FIGS. 1-3 and described herein may decrease fuel consumption, increase operability, increase engine performance and/or power output while maintaining or reducing weight, part count, and/or packaging (e.g. radial and/or axial dimensions). The systems provided herein may allow for increased bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane). Additionally, the systems provided herein may reduce gas turbine engine packaging and weight, thus increasing efficiency, by reducing rotating and/or stationary airfoil quantities (e.g. blades and/or vanes).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a radial direction, a circumferential direction, an axial centerline along a longitudinal direction, and an upstream end and a downstream end along the longitudinal direction, and further wherein the gas turbine engine defines a core flowpath extended generally along the longitudinal direction, the gas turbine engine comprising:
   a first turbine rotor comprising an annular outer band disposed outward of the core flowpath along the radial direction, and wherein the first turbine rotor further comprises a plurality of airfoils coupled to an inner diameter of the outer band, the plurality of airfoils extended generally inward along the radial direction, and wherein the outer band defines a plurality of airfoil cooling passages, the plurality of airfoil cooling passages extended at least partially in the radial direction in fluid communication with the plurality of airfoils.

2. The gas turbine engine of claim 1, wherein the outer band defines a first aperture and a second aperture, and wherein the first aperture defines a first aperture area and the second aperture defines a second aperture area, and further wherein the first aperture is defined at an outer diameter of the outer band and the second aperture is defined at an inner diameter of the outer band.

3. The gas turbine engine of claim 2, wherein the first aperture area defines a greater area than the second aperture area.

4. The gas turbine engine of claim 2, wherein each airfoil cooling passage of the plurality of airfoil cooling passages is defined between the first aperture and the second aperture.

5. The gas turbine engine of claim 4, wherein the outer band comprises a first cooling passage wall and a second cooling passage wall at each of the plurality of airfoil cooling passages between the first aperture and the second aperture.

6. The gas turbine engine of claim 4, wherein each of the first cooling passage walls and second cooling passage walls together define a serpentine structure between the outer diameter and inner diameter of the outer band.

7. The gas turbine engine of claim 4, wherein the airfoil cooling passages defined between the first aperture and the second aperture define a decreasing volume of the cooling passage.

8. The gas turbine engine of claim 1, wherein the outer band further defines a plurality of axial passages extended generally along the longitudinal direction.

9. The gas turbine engine of claim 1, wherein the plurality of airfoils defines one or more cooling fluid orifices at an outer diameter of the airfoil.

10. The gas turbine engine of claim 1, wherein each airfoil cooling passage of the plurality of airfoil cooling passages is extended at least partially along the circumferential direction in the same direction of rotation as the first turbine rotor along the circumferential direction.

11. The gas turbine engine of claim 1, the engine further comprising:
    a second turbine rotor interdigitated among the first turbine rotor along the longitudinal direction, wherein the second turbine rotor includes a plurality of second turbine airfoils extended outward in the radial direction.

12. The gas turbine engine of claim 11, wherein the engine defines, in serial flow arrangement from the upstream end to the downstream end, a plurality of upstream airfoils of the first turbine rotor, the plurality of second turbine airfoils of the second turbine rotor, and the plurality of downstream airfoils of the first turbine rotor.

13. The gas turbine engine of claim 11, the engine further comprising:
    a combustion section disposed upstream of the first turbine rotor and the second turbine rotor.

14. The gas turbine engine of claim 13, wherein the engine defines, in serial flow arrangement, the combustion section, a plurality of upstream airfoils of the first turbine rotor, and the plurality of second turbine airfoils of the second turbine rotor, and the plurality of downstream airfoils of the first turbine rotor.

15. The gas turbine engine of claim 1, the engine further comprising:
    a turbine casing surrounding the first turbine rotor along the longitudinal direction and the circumferential direction.

16. The gas turbine engine of claim 15, wherein the turbine casing and the first turbine rotor together define a first seal interface disposed upstream of the plurality of airfoils of the first turbine rotor and a second seal interface disposed downstream of the plurality of airfoils of the first turbine rotor.

17. The gas turbine engine of claim 16, wherein the turbine casing and the first turbine rotor define a cooling cavity between the first seal interface, the second seal interface, the turbine casing, and the outer band of the first turbine rotor.

18. The gas turbine engine of claim 16, wherein the turbine casing comprises a plurality of shrouds disposed inwardly along the radial direction, and wherein the first turbine rotor comprises a plurality of knife edge seals disposed outwardly along the radial direction toward the plurality of shrouds.

19. The gas turbine engine of claim 18, wherein an upstream portion of the plurality of shrouds and an upstream portion of the plurality of knife edge seals define the first seal interface, and wherein a downstream portion of the plurality of shrouds and a downstream portion of the plurality of knife edge seals define the second seal interface.

20. The gas turbine engine of claim 1, further comprising a connecting airfoil disposed downstream of the plurality of airfoils, wherein the connecting airfoil is coupled to the outer band on a radially outward end, and wherein the connecting airfoil is coupled to a rotor on a radially inward end.

* * * * *